United States Patent Office 3,248,246
Patented Apr. 26, 1966

3,248,246
COATING COMPOSITION
Russell L. Sears, Detroit, Mich., assignor to Rinshed-Mason Company, Detroit, Mich., a corporation of Michigan
No Drawing. Filed Mar. 8, 1962, Ser. No. 178,248
8 Claims. (Cl. 106—177)

The present invention relates to a primer coating composition, and more particularly to a primer for acetal plastic surfaces.

Acetal plastics are a relatively new commercially available material. Acetal plastics have several chemical and physical properties which permit the use thereof as a substitute in many applications for metals of previously used plastics. Acetal plastic, also known as polyoxymethylene, has the general formula $(CH_2O)_n$. This material may be modified by copolymerization with small amounts of other polymers, in which case it may be referred to as a polyoxymethylene copolymer.

Difficulty has been encountered in applying decorative coatings to acetal plastic parts. The plastic has a very slippery and solvent resistant surface. Conventional coatings, commonly used in the art, will not adhere to the slick and solvent resistant surface of acetal plastic parts. Two methods have been proposed for priming acetal plastics to permit the application of a conventional decorative topcoat. However, each method had disadvantages from the standpoint of practical mass production. One of the proposed systems comprises a chemical etching treatment of the plastic part which leaves a fragile, powdery coating on the surface. This coating acts as a primer. However, the powdery coating is easily damaged by abrasive contact with other materials, such as occurs during shipping or handling. If this coating is removed, a subsequently applied decorative coating will not adhere to the part. The second proposed system comprises a special primer which requires almost laboratory facilities to properly apply. The application of this primer involves the use of a very narrow baking temperature range which is very difficult to maintain in actual production line practice.

The present invention solves this problem by providing a primer coating composition which is suitable for acetal plastics and which does not require a narrow baking temperature range and is thus suitable for conventional production line techniques. It is to be noted, however, that while the primer is particularly adapted for use on acetal plastics, it may be used on other materials as well.

The primer coating composition of the invention is essentially a three component system. It is believed that the primer chemically reacts with the surface of the acetal plastic for adhesion thereto.

One component of the primer is a film-forming polymer of the type that dries by solvent evaporation. The film-former is preferably a thermoplastic, organic solvent soluble material selected from the following group:

Cellulose acetate butyrate, cellulose acetate propionate, nitrocellulose, chlorinated rubber, polyvinyl chloride-acetate copolymers, and polyvinyl acetal polymers.

The distinctive feature of the members of this group is that each has either an hydroxyl group or chlorine bearing chain as a part thereof. These groups are believed to take part in the chemical reaction which occurs when the primer is applied. It has been found that the thermosetting and oxidizing type of film-formers are not satisfactory for this primer. This is likely due to the fact that such materials do not have the above-mentioned reaction groups. In addition to its function as a chemical reactant, the film-former also functions to give body to the primer. The other materials used in the primer are non-viscous liquids and would run off any surface to which they were applied before a primer film could be formed unless a material with body were also incorporated into the primer.

The second component of the primer is a liquid tertiary ester of phosphoric acid with the ester linkage to an aliphatic carbon, and conforming to the general formula: $(RO)(R'O)(R''O)PO$ where R, R' and R" are aliphatic chains containing one chlorine atom. This formula does not exclude other groups, for example, hydroxyl groups, being attached to the aliphatic chain.

The third component of the primer is boron trifluoride which acts as a catalyst in the system. Boron trifluoride is a gas and additionally is toxic to humans. Therefore, the boron trifluoride is preferably complexed with another compound to form a non-toxic solid or liquid. This complex dissociates upon being subjected to elevated temperatures to release the boron trifluoride which then acts as a catalyst. The composition of the complex is not critical, excepting that it must have a dissociation temperature lower than the baking temperature to be used in curing the coating.

Examples of boron trifluoride complexes which have been used satisfactorily are:

| | Percent $BF_3$ |
|---|---|
| (1) $BF_3$:n-ethyl amine | 60 |
| (2) $BF_3$:diethyl etherate | 48 |
| (3) $BF_3$:di-n-butyl etherate | 34 |
| (4) $BF_3$:dimethanol | 52 |
| (5) $BF_3$:dihydrate | 67 |
| (6) $BF_3$:tri-o-tolyl phosphate | 16 |
| (7) $BF_3$:p-cresol | 39 |
| (8) $BF_3$:dimethyl formamide | 48 |
| (9) $BF_3$:o-ethyl aniline | 36 |

While the composition of the boron trifluoride complex is not critical, a suitable choice should be made to obtain the properties desired in a coating composition such as baking temperature and package stability. Additionally, the complex should be compatible with the other ingredients used in the coating.

The preferred proportions of these three ingredients, which together may be considered to be the binder, are by weight, from 3.0 to 35.0% of the film-forming polymer, from 62.0 to 96.75% of the phosphoric acid ester, and from 0.25 to 3.0% of the catalyst.

It has also been found that the use of a pigment is desirable in the composition. The pure primer has an undesirable coloration and the pigment serves to mask this coloration. Additionally, there is a tendency for the applied film to crack if a pigment is not used. The type and degree of pigmentation is not critical, however, it has been found that the most practical pigment range is between .25/1.0 to 3.0/1.0 pigment to binder by weight, where the binder is selected from the three previously mentioned ingredients. Any pigment color and any extender pigment can be used provided that it forms a stable mixture with the binder material. The degree of dispersion of the pigment is not critical excepting as it effects the film texture and appearance as in conventional paints.

The binder and pigment must, of course, be reduced with a solvent for application to a surface. Examples of suitable solvent blends are as follows.

Solvent blend No. 1: Percent by weight
Toluol _____ 57.0
Methyl isobutyl ketone _____ 30.0
Butanol _____ 6.5
Isopropanol _____ 6.5

100.0

Solvent blend No. 2:

| | Percent by weight |
|---|---|
| Butyl Cellosolve acetate | 6.5 |
| Acetone | 6.5 |
| Toluol | 60.8 |
| Cellosolve acetate | 8.7 |
| Butanol | 17.5 |
| | 100.0 |

Solvent blend No. 3:

| | Percent by weight |
|---|---|
| Xylol | 35.0 |
| Methyl isobutyl ketone | 35.0 |
| Butyl Cellosolve acetate | 30.0 |
| | 100.0 |

All of the examples of the primer coating composition which are to follow were prepared in substantially the same manner. The ingredients were mixed together and ground to a fineness of 10μ in a porcelain mill. The finished primer was reduced by the addition of an equal volume of solvent blend No. 1 for spray application to a surface. The examples are as follows:

Example I

| | Parts by weight |
|---|---|
| Tris-2-chloroethyl phosphate | 366.0 |
| Cellulose acetate propionate, 20″ | 19.3 |
| Boron trifluoride:diethyl etherate | 11.5 |
| Rutile titanium dioxide | 82.0 |
| Carbon black | 4.3 |
| Magnesium silicate | 9.5 |
| Solvent blend No. 2 | 507.4 |
| | 1000.0 |

Example II

| | Parts by weight |
|---|---|
| Tris-2-chloroethyl phosphate | 285.0 |
| Cellulose acetate propionate, 20″ | 71.0 |
| Boron trifluoride:dimethyl formamide | 10.7 |
| Rutile titanium dioxide | 169.5 |
| Carbon black | 1.1 |
| Magnesium silicate | 12.7 |
| Colvent blend No. 2 | 450.0 |
| | 1000.0 |

Example III

| | Parts by weight |
|---|---|
| Tris-2-chloroethyl phosphate | 336.2 |
| Cellulose acetate butyrate | 37.4 |
| Boron trifluoride:dihydrate | 11.4 |
| Lithopone | 30.0 |
| Red iron oxide | 100.0 |
| Solvent blend No. 2 | 485.0 |
| | 1000.0 |

Example IV

| | Parts by weight |
|---|---|
| Tris-3-chlor, 2-hydroxyl propyl phosphate | 270.0 |
| Nitrocellulose, ss, 5–6″ | 24.3 |
| Nitrocellulose, RS, ½″ | 24.3 |
| Boron trifluoride:dimethanol | 9.5 |
| Titanium calcium (30% $TiO_2$) | 219.5 |
| Lampblack | 3.1 |
| Solvent blend No. 2 | 449.3 |
| | 1000.0 |

Example V

| | Parts by weight |
|---|---|
| Tris-3-chloropropyl phosphate | 386.6 |
| Polyvinyl chloride-acetate copolymer [1] | 42.9 |
| Boron trifluoride:diethyl etherate | 13.0 |
| Rutile titanium dioxide | 91.4 |
| Phthalocyanine green toner | 4.6 |
| Magnesium silicate | 11.5 |
| Solvent blend No. 3 | 450.0 |
| | 1000.0 |

[1] Containing 87% by weight of vinyl chloride and 13% by weight of vinyl acetate.

Example VI

| | Parts by weight |
|---|---|
| Tris-2-chloroethyl phosphate | 255.4 |
| Chlorinate rubber, 10 cp. | 137.5 |
| Boron trifluoride:diethyl etherate | 8.7 |
| Rutile titanium dioxide | 81.6 |
| Lampblack | 4.3 |
| Magnesium silicate | 12.5 |
| Solvent blend No. 2 | 500.0 |
| | 1000.0 |

Each of the foregoing embodiments of the primer were applied to acetal plastic parts with satisfactory results. In applying the primer, the plastic part was first wiped with a common solvent such as xylol to clean the surface. The clean surface was then coated with the primer. The method of application is not critical, although spray techniques were used with the foregoing examples. Any common commercial means suitable for the part to be coated may be employed. For example, the primer may be applied by spraying, dipping, electrostatic spraying, airless spraying, roller coating, curtain coating and the like. After the coating is applied, the primed part is air dried (or flashed) for a convenient, non-critical period to permit a portion of the volatile material to evaporate. The non-criticality of the air drying period is advantageous because it means that parts which have not been baked may be left in the air drying stage for as much as twenty-four or forty-eight hour periods. This is desirable in plants which may have the normal weekend shut-down.

After air drying, the part is baked at temperatures of from 250° F. to 315° F. for a time ranging from 10 to 30 minutes depending on the temperature employed. The baking temperature should not be above 324° F. as this is the approximate melting temperature of acetal plastic. The dry film thickness of the baked primer coating is not critical. Film thickness ranging from 0.2 to 1.2 mils have given satisfactory results. For reasons of economy and ease of application, the preferred dry film thickness is about 0.4 to 0.6 mil.

After baking, the primed part can be coated with any one of a wide varieties of decorative finishes of a well-known and conventional nature. The following list, although not exhaustive, is representative of the decorative materials which may be used.

(1) Alkyd-amino resin baking enamels in a wide variety of colors and degrees of gloss.
(2) Thermoplastic acrylic resin lacquers in a wide variety of colors and degrees of gloss.
(3) Oxidizing alyd air dry enamels in a wide variety of colors and degrees of gloss.
(4) Nitrocellulose lacquers in a wide variety of colors and degrees of gloss.

The applied primer has been found to form a tight, hard film on acetal plastic parts, which film is functionally suitable for the further application of decorative top coats and which is eminently practical for use in mass production techniques.

Having thus described my invention, I claim:

1. A primer coating composition adapted for use on acetal plastic surfaces comprising as essential film-forming components a mixture of (a) a thermoplastic, organic solvent soluble film-forming polymer containing a material selected from the group consisting of a hydroxyl group and a chlorine bearing chain attached to the main carbon chain and (b) a liquid tertiary ester of phosphoric acid with the ester linkage to an aliphatic carbon, said ester conforming to the general formula (RO)(R'O)(R''O)PO, where R, R' and R'' are aliphatic chains containing one chlorine atom; said coating composition also including boron trifluoride to act as a catalyst, and a solvent.

2. A primer coating composition comprising as essential film-forming components a mixture of (a) a thermoplastic, organic solvent soluble film-forming polymer selected from the group consisting of cellulose acetate butyrate, cellulose acetate propionate, nitrocellulose, chlorinated rubber, polyvinyl chloride-acetate copolymers and polyvinyl acetal polymers and (b) a liquid tertiary ester of phosphoric acid with the ester linkage to an aliphatic carbon, said ester conforming to the general formula (RO)(R'O)(R''O)PO, where R, R' and R'' are aliphatic chains containing one chlorine atom; said coating composition also including boron trifluoride to act as a catalyst, and a solvent.

3. A primer coating composition having a binder consisting essentially of a mixture of (a) from 3.0 to 35.0% by weight of a thermoplastic, organic solvent soluble film-forming polymer containing a material selected from the group consisting of a hydroxyl group and a chlorine bearing chain attached to the main carbon chain, (b) from 62.0 to 96.75% by weight of a liquid tertiary ester of phosphoric acid with the ester linkage to an aliphatic carbon, said ester conforming to the general formula (RO)(R'O)(R''O)PO, where R, R' and R'' are aliphatic chains containing one chlorine atom, and from 0.25 to 3.0% by weight of a non-gaseous boron trifluoride complex, and a solvent.

4. The composition of claim 3 and further characterized in that the thermoplastic, organic solvent soluble film-forming polymer is selected from the group consisting of cellulose acetate butyrate, cellulose acetate propionate, nitrocellulose, chlorinated rubber, polyvinyl chloride-acetate copolymers and polyvinyl acetal polymers.

5. A composition in accordance with claim 3 and further characterized in the provision of a pigment; said pigment being present in the ratio of from .25/1.0 to 3.0/1.0 pigment to binder by weight.

6. A primer coating composition adapted for use on acetal plastic surfaces comprising an essential film-forming components a mixture of (a) a thermoplastic, organic solvent soluble film-forming polymer containing a material selected from the group consisting of a hydroxyl group and a chlorine bearing chain attached to the main carbon chain, and (b) a liquid tertiary ester of phosphoric acid selected from the group consisting of tris-2-chloroethyl phosphate, tris-3-chlor, 2 hydroxyl propyl phosphate and tris-3-chloropropyl phosphate; said coating composition also including boron trifluoride to act as a catalyst and a solvent.

7. A primer coating composition comprising as essential film-forming components a mixture of (a) a thermoplastic, organic solvent soluble film-forming polymer selected from the group consisting of cellulose acetate butyrate, cellulose acetate propionate, nitrocellulose, chlorinated rubber, polyvinyl chloride-acetate copolymers and polyvinyl acetal polymers and (b) a liquid tertiary ester of phosphoric acid selected from the group consisting of tris-2-chloroethyl phosphate, tris-3-chlor, 2-hydroxyl propyl phosphate, and tris-3-chloropropyl phosphate; said coating composition also including boron trifluoride to act as a catalyst and a solvent.

8. A primer coating composition having a binder consisting essentially of a mixture of (a) from 3.0 to 35.0 percent by weight of a thermoplastic, organic solvent soluble film-forming polymer containing a material selected from the group consisting of a hydroxyl group and a chlorine bearing chain attached to the main carbon chain, (b) from 62.0 to 96.75 percent by weight of a liquid tertiary ester of phosphoric acid selected from the group consisting of tris-2-chloroethyl phosphate, tris-3-chlor, 2-hydroxyl propyl phosphate and tris-3-chloropropyl phosphate, from 0.25 to 3.0 percent by weight of a non-gaseous boron trifluoride complex, and a solvent.

References Cited by the Examiner

UNITED STATES PATENTS

| | | | |
|---|---|---|---|
| 2,330,251 | 9/1943 | Taylor et al. | 106—177 |
| 2,330,254 | 9/1943 | Whitehead | 106—177 |
| 2,948,641 | 8/1960 | McCluer | 106—15 |
| 3,072,609 | 1/1963 | Berardinelli et al. | 260—67 |

ALEXANDER H. BRODMERKEL, *Primary Examiner.*

MORRIS LIEBMAN, *Examiner.*